US008289331B1

(12) United States Patent
Trezevant

(10) Patent No.: US 8,289,331 B1
(45) Date of Patent: Oct. 16, 2012

(54) ASYMMETRIC ANIMATION LINKS

(75) Inventor: Warren Trezevant, Oakland, CA (US)

(73) Assignee: Pixar, Emeryville, CA (US)

( * ) Notice: Subject to any disclaimer, the term of this patent is extended or adjusted under 35 U.S.C. 154(b) by 1042 days.

(21) Appl. No.: 12/248,857

(22) Filed: Oct. 9, 2008

Related U.S. Application Data

(60) Provisional application No. 60/982,168, filed on Oct. 24, 2007.

(51) Int. Cl.
*G06T 13/00* (2006.01)

(52) U.S. Cl. ........................................ 345/474; 345/473

(58) Field of Classification Search ........................ None
See application file for complete search history.

(56) References Cited

U.S. PATENT DOCUMENTS 6,014,150 A * 1/2000 Boucher ........................ 345/473
6,057,859 A * 5/2000 Handelman et al. .......... 345/474

OTHER PUBLICATIONS

J. Zhao and N. Badler, "Inverse Kinematics Positioning Using Nonlinear Programming for Highly Articulated Figures", Oct. 1994, ACM, Journal of ACM Transactions on Graphics (TOG), vol. 13, Issue 4, pp. 313-336.*

* cited by examiner

*Primary Examiner* — Ulka Chauhan
*Assistant Examiner* — Robert Bader
(74) *Attorney, Agent, or Firm* — Patterson & Sheridan, LLP

(57) ABSTRACT

Asymmetric animation links control motion propagation through motion element graphs of models. Asymmetric animation links have direction attributes. When a motion element is moved, the influence of this motion propagates away from this motion element through the motion element graph. Upon reaching an asymmetric animation link, if the direction of motion propagation through the graph matches the forward direction of the asymmetric animation link, this motion will pass through the asymmetric animation link to potentially influence additional motion elements. If the motion propagates through the graph in the reverse direction of an asymmetric animation link, then the asymmetric animation link will block the motion from traveling past the asymmetric animation link. Asymmetric animation links can be added or removed from models and can connect two or more models. Additionally, the direction attribute of an asymmetric animation link may be reversed as needed to change the behavior of the motion element.

32 Claims, 13 Drawing Sheets

200b

300a

ASYMMETRIC ANIMATION LINKS

CROSS-REFERENCE TO RELATED APPLICATIONS

This application claims priority to U.S. Provisional Patent Application No. 60/982,168, and filed on Oct. 24, 2007, which is incorporated by reference herein for all purposes.

BACKGROUND

The present invention relates to the field of computer graphics, and in particular to methods and apparatus for manipulating and posing computer graphics objects. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

In computer-generated animation, an object's appearance is defined by a three-dimensional computer model. To appear realistic, the computer model of an object is often extremely complex, having millions of surfaces and tens of thousands of attributes. Due to the complexity involved with animating such complex models, particularly character models with hundreds or thousands of degrees of freedom, animators often rely on animation tools to define the object animation.

Animators typically use animation tools to specify animation variables, which are parameters used by functions to modify the position and orientation, or pose, of all or a portion of a model. Animation variables may specify relatively simple motions, such as the translation and rotation of objects, or complicated motions and model deformations, such as complex deformations and movements of the facial features.

Animators typically define animation variable values at specific frames or discrete moments of time, referred to as keyframes. The value of an animation variable along with its associated time is referred to as a control knot. Animation tools often interpolate animation variable values between control knots to determine the pose of models at other frames or moments of time.

Many models include complex hierarchies of joints. For example, a character model can include a shoulder joint connected between a torso model and an upper arm model, an elbow joint connected between the upper arm model and a lower arm model, a wrist joint connected between the lower arm model and a hand model, and several finger joints connected between the hand model and finger models. The pose or position and orientation of all of these portions of the character model's arm may be specified at least in part by the joint rotation angles of the shoulder joint, the elbow joint, the wrist joint, and the finger joints. Animators can specify these joint rotation angles directly. This is referred to as forward kinematics.

Alternatively, an animator may define the pose of a portion of a character model by specifying the position of one or more joints, rather than the joint angles. This is referred as inverse kinematics. In inverse kinematics, the animator often leaves some joints' positions unspecified or unconstrained. The animation tools then determine the positions of the unconstrained joints, based upon the lengths of "bones" between joints and each joint's acceptable range of motion. For example, an elbow joint may be constrained to a range of 150 degrees of rotation to prevent the animation tools from setting this joint's rotation angles outside of the range of motion possible in human anatomy. For example, an animator may specify that the hand of character model should contact another object in a scene. Thus, the animator specifies a position for the wrist joint. The animation tools then calculate the joint positions for the shoulder and elbow joints necessary for the hand to contact the object as specified.

Prior inverse kinematics techniques typically operate in one direction along a hierarchy of joints. For example, if an animator moves the elbow joint of a character model, the animation tool will use inverse kinematics to specify the positions of the shoulder and torso of the character model. In this example, the animation tool uses inverse kinematics to travel "up" the joint hierarchy from the joint being manipulated by a user (e.g. the elbow joint) to the top of the joint hierarchy. However, joints "below" the manipulated joint will simply follow the manipulated joint. For example, when the animator moves the elbow joint of a character model, the forearm and hand of the character model will rigidly follow the elbow joint without changing their relative orientation.

The directionality of prior inverse kinematics techniques is typically statically determined from the hierarchy of joints. However, these static unidirectional inverse kinematics techniques can make posing models difficult and time consuming. For example, an animator may first specify a position of the wrist joint of a character model to place the character's hand in contact with an object. The animation tools will then determine positions for the elbow, shoulder, and other joints of the character model. If the animator then tries to adjust the position of the elbow joint, the wrist joint, being "below" the elbow joint in the joint hierarchy, will rigidly move away from the object, undoing the animator's initial efforts in placing the hand in contact with the object.

One solution to prevent these types of problems with unidirectional inverse kinematics techniques is to use omni-directional inverse kinematics techniques. Omni-directional inverse kinematics techniques do not rely on a static hierarchy of joints to determine the positions of unconstrained joints. Instead, animators define "pins" for one or more joints. A joint that has been pinned will remain in a fixed position regardless of how other joints are manipulated. In general, when a portion of a model is manipulated, animation tools will apply inverse kinematics techniques to determine the positions of any joints located in a graph of joints between the manipulated portion of the model and one or more pinned joints. The animation tool may then define control knots that specify the joint positions or joint angles at the current frame or time for these joints.

For example, if a user sets a pin on the shoulder joint of a character model and then manipulates the position of the character model's hand, the wrist joint, elbow joint, and any other joints between the hand and the pinned shoulder joint will be posed using inverse kinematics techniques. Pins can be dynamically activated or deactivated for any joint. Continuing with this example, once the user has positioned the character model's hand, the user can set a pin to hold the hand in its new position. The user may then move the elbow joint of the character model to change the orientation of the upper and lower arms of the character, while keeping both the shoulder joint and hand in their previously specified positions. If the user then deactivates the pin in the shoulder joint and moves the shoulder joint, the animation tool will use inverse kinematics to further adjust the position of the character model's arm without changing the position of the hand. In this example, the animation tool applies inverse kinematics techniques in different directions through the graph of joints depending upon which joints are pinned or manipulated.

However, setting and unsetting pins for joints may be tedious and time-consuming for users. Additionally, kinematic chains, such as sets of connected joints implementing, for example, the limbs of character models, may behave unexpectedly if joints are not pinned correctly.

SUMMARY

An embodiment of the invention includes asymmetric animation links to control the propagation of motion through graphs of motion elements of one or more character models. An asymmetric animation link may be associated with any motion element, such as a joint, of a model. Each asymmetric animation link is assigned a direction attribute that specifies a forward direction and a reverse direction for a motion element. The direction attribute of an asymmetric animation link determines how motion propagates through its associated motion element.

When a motion element is moved, the influence of this motion propagates away from this motion element through the graph of motion elements in all directions. Upon reaching an asymmetric animation link, if the direction of propagation of motion influence through the graph matches the forward direction of the asymmetric animation link, the influence of this motion will pass through the asymmetric animation link to potentially influence additional motion elements. In this direction, the asymmetric animation link behaves as a normal unpinned motion element. Conversely, if the motion influence is propagating through the graph of motion elements in the reverse direction of an asymmetric animation link, then the asymmetric animation link will block the motion influence from traveling past the asymmetric animation link. Thus, the movement of motion elements on the reverse side of the asymmetric animation link will not influence or affect motion elements on the opposite side of the asymmetric animation link. In the reverse direction, the asymmetric animation link behaves as if it were a pinned motion element.

Asymmetric animation links can be added or removed from the motion elements of models. Asymmetric animation links can also be added when two or more models with separate sets of motion elements are connected together. Users or applications can selectively activate or deactivate all or a portion of the asymmetric animation links associated with a model. Additionally, users or applications can reverse the direction attribute of an asymmetric animation link to change the behavior of the motion element.

BRIEF DESCRIPTION OF THE DRAWINGS

The invention will be described with reference to the drawings, in which.

DETAILED DESCRIPTION

An embodiment of the invention includes asymmetric animation links to control the propagation of motion through graphs of joints or other motion elements of one or more character models. A motion element of a model includes any component or entity capable of movement in response to an input, such as joints, soft or rigid bodies, a particle in a particle system, a mass included in a spring-mass system, or a simulation node in a physics or materials simulation. An asymmetric animation link may be associated with any joint or other motion element of a model. Alternatively, an asymmetric animation link is associated with a connection between two or more joints or other motion elements. Each asymmetric animation link is assigned a direction attribute that specifies a forward direction and a reverse direction relative to its associated motion elements. The direction attribute of an asymmetric animation link determines how motion propagates between motion elements.

When a motion element is moved, the influence of this motion propagates away from this motion element through the graph of motion elements in all directions. Upon reaching an asymmetric animation link, if the direction of propagation of motion influence through the graph matches the forward direction of the asymmetric animation link, the influence of this motion will pass through the asymmetric animation link to potentially influence additional motion elements. In this direction, the asymmetric animation link behaves as a normal unpinned motion element. Conversely, if the motion influence is propagating through the graph of motion elements in the reverse direction of an asymmetric animation link, then the asymmetric animation link will block the motion influence from traveling past the asymmetric animation link. Thus, the movement of motion elements on the reverse side of the asymmetric animation link will not influence or affect motion elements on the opposite side of the asymmetric animation link. In the reverse direction, the asymmetric animation link behaves as if it were a pinned motion element.

Asymmetric animation links can be added or removed from the graph of motion elements of models. Asymmetric animation links can also be added when two or more models with separate sets of motion elements are connected together. Users or applications can selectively activate or deactivate all or a portion of the asymmetric animation links associated with a model. Additionally, users or applications can reverse the direction attribute of an asymmetric animation link to change the behavior of the motion element.

Figure 1:
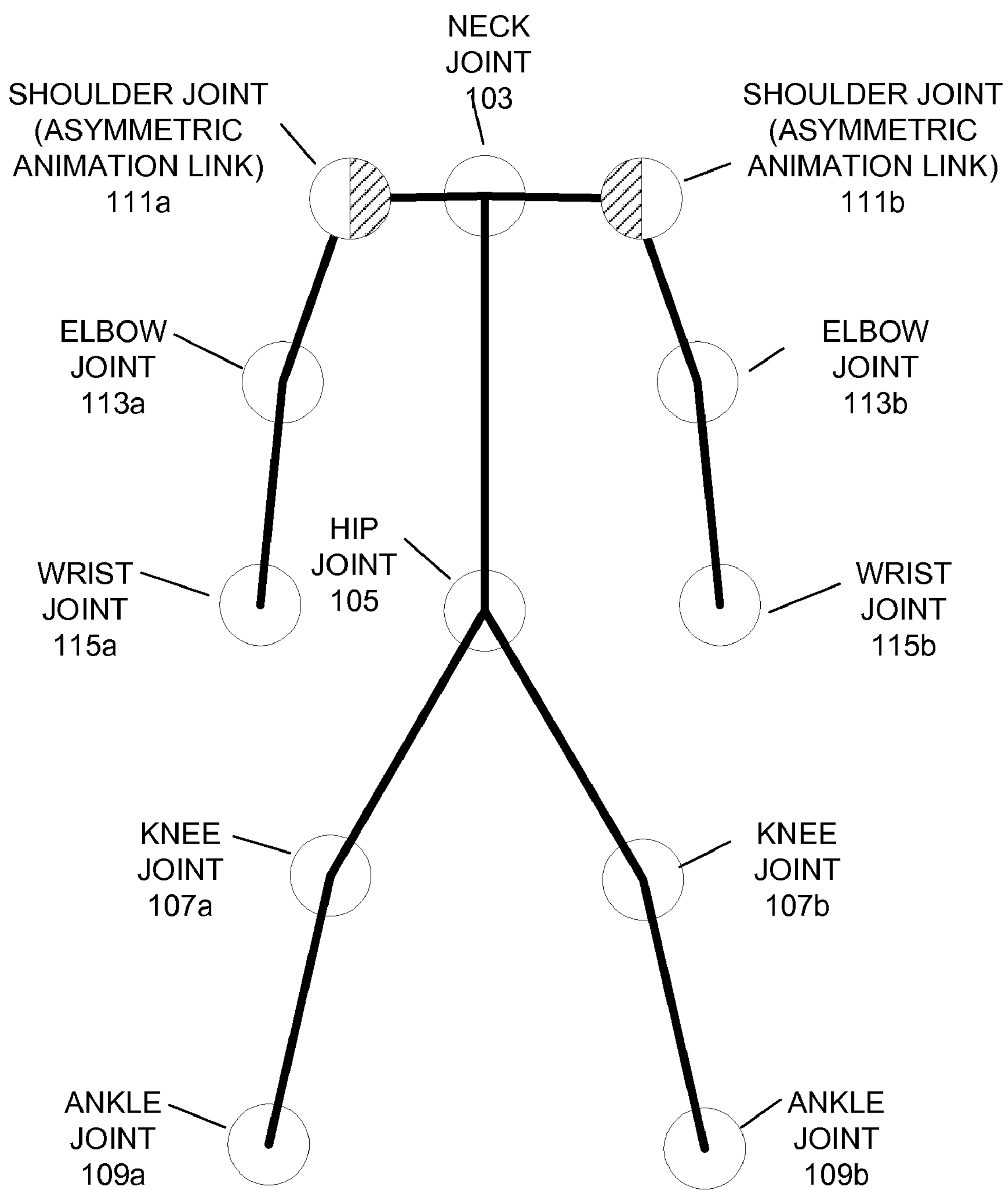
FIG. 1 illustrates an example set of joints associated with a character model according to an embodiment of the invention.

FIG. 1 illustrates an example set of joints 100 associated with a character model according to an embodiment of the invention. Although the figures illustrate models and their joints in two dimensions for clarity, embodiments of the invention are intended for use with models and animation in three-dimensions as well. The example set of joints 100 are connected together with bones, each of which specifies the orientation of a coordinate space of the joint and may specify the relative position of one or more adjacent joints. In FIG. 1 and other figures, joints are represented as circles and bones are represented as lines.

In the example of FIG. 1, the set of joints is adapted to control a simple humanoid character model. The set of joints includes a neck joint 103; a hip joint 105; knee joints 107 and ankle joints 109 defining a pair of legs; and shoulder joints 111, elbow joints 113, and wrist joints 115 defining a pair of arms.

FIG. 1 shows asymmetric animation links assigned to the two shoulder joints 111. In FIG. 1 and the other figures, asymmetric animation links are indicated with half shaded circles. The shading also indicates the direction of an asymmetric animation link. The unshaded half of a circle indicates the "forward" side of the asymmetric animation link and the shaded half of the circle indicated the "reverse" side of the asymmetric animation link. In the example of FIG. 1, motion traveling from the neck joint 103 through the shoulder joint 111*a* towards its adjacent elbow joint 113*a* is referred to as heading in the forward direction (from the reverse side to the forward side). Conversely, motion traveling from an elbow joint 113*a* through an adjacent shoulder joint 111*a* toward the neck joint 103 is referred to as heading in the reverse direction (from the forward side to the reverse side).

In an embodiment, an animation tool can use similar visual representations of joints and asymmetric animation links to convey to users the location and direction of asymmetric animation links. Animation tools may allow users to interact with these visual representations of asymmetric animation links directly. For example, if the user double-clicks or otherwise selects the visual representation of an asymmetric animation link, an embodiment of an animation tool may reverse the direction of this asymmetric animation link. If a user deactivates one or more asymmetric animation links, the visual representation may change from a half-shaded circle or sphere to an unshaded circle or sphere representing a normal joint.

Figure 2A:
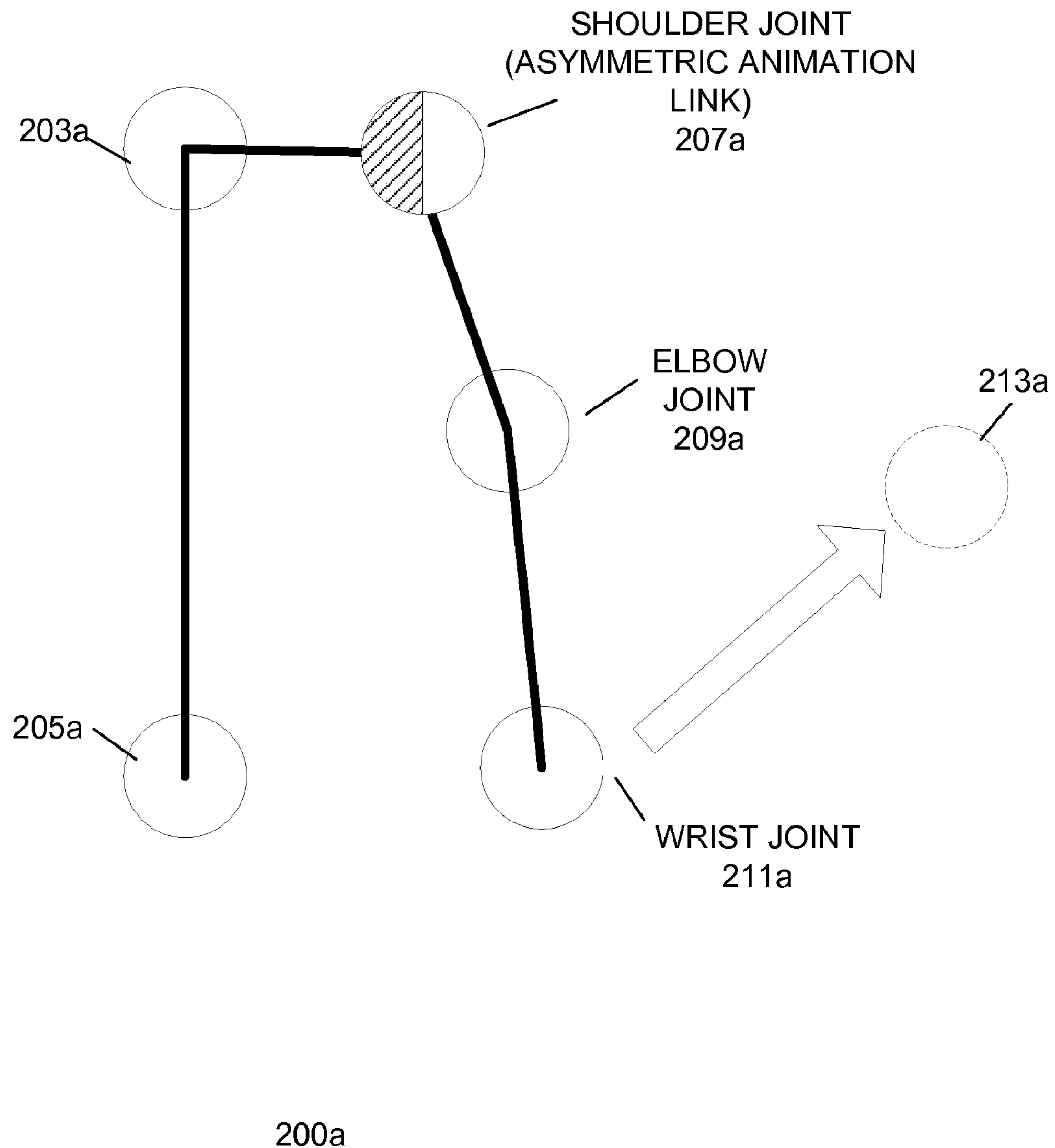
FIGS. 2A-2D illustrate example operations asymmetric animation links according to an embodiment of the invention.

FIGS. 2A-2D illustrate example operations asymmetric animation links according to an embodiment of the invention. FIG. 2A illustrates a first pose 200*a* of a portion of the set of joints of FIG. 1, including joints representing the torso and one arm of a character model. These joints include a neck joint 203*a*; a hip joint 205*a*; a shoulder joint 207*a*; an elbow joint 209*a*; and a wrist joint 211*a*. The shoulder joint 207*a* is associated with an asymmetric animation link. This asymmetric animation link is configured so that that the elbow joint 209*a* is on the "forward" side of the asymmetric animation link and the neck joint 203*a* is on the "reverse" side of the asymmetric animation link.

In the example of FIG. 2A, a user or other application moves the wrist joint 211*a* from its initial position to a new position 213*a*. This may occur in response to input from a keyboard, mouse, or other input device or from the output of a program, procedure, or application. In response to the movement of wrist joint 211*a* to the new position 213*a*, the animation tool may use inverse kinematics to determine new positions for some or all of the joints connected with wrist joint 211*a*.

Because the movement of the wrist joint 211*a* may affect the elbow joint 209*a*, shoulder joint 207*a*, and potentially other joints, the movement of the wrist joint is said to propagate through the graph of joints. Thus, in response to this movement of the wrist joint 211*a*, the animation tool traverses the graph of joints connected with wrist joint 211*a* to determine if any other joints should be moved.

In this example, the motion of the wrist joint 211*a* propagates through the graph of joints towards the shoulder joint 207*a*. This direction of propagation through the graph of joints corresponds with the "reverse" direction defined by the asymmetric animation link associated with the shoulder joint 207*a*. As discussed above, an asymmetric animation link blocks or stops the propagation of motion in the reverse direction, making the joint act as if it were pinned to its current position. Thus, the motion of the wrist joint 211*a* is stopped at the shoulder joint 207*a* from propagating further through the graph of joints. As a result, the animation tool defines a kinematic chain, which is a set of connected joints, including the wrist joint 211*a*, elbow joint 209*a*, and the shoulder joint 207*a*. The asymmetric animation link further constrains the shoulder joint 207*a* to its current position. The neck joint 203*a* and hip joint 205*a*, being located on the opposite side of the shoulder joint 207*a*, will not be affected by the motion the wrist joint 211*a*. Thus, in this example, the kinematic chain of connected joints is an active subgraph of the graph of joints affected by the motion input. The remaining joints in the graph, such as joints 207*a*, 203*a*, and 305*a*, may be viewed as included in an inactive subgraph of the graph of joints.

Depending upon the joints being manipulated and the complexity of the graph of joints, the animation tool may identify one or more kinematic chains or active subgraphs affected by the movement of a joint. In this example, there is only one kinematic chain comprised of the wrist joint 211*a*, elbow joint 207*a*, and the shoulder joint 205*a*. In an embodiment, the animation tool provides at least the active subgraph of joints or other motion elements to a dynamics analysis module or application. The dynamics analysis module uses the motion input and the attributes of the active subgraph of motion elements to determine the pose or other response of the motion elements to the motion input. Examples of dynamics analysis modules include inverse kinematics modules, rigid body dynamics simulations, particle system simulations, cloth simulations, and other dynamics or motion analysis systems.

For example, an animation tool may use inverse kinematics techniques to evaluate each kinematic chain and any associated joint constraints to determine a new pose of the model. In an embodiment, the animation tool may express the new pose of the model using joint positions, joint rotations, or any combination of thereof. An additional embodiment of the animation tool may determine the pose in one format, such as applying inverse kinematics to determine joint positions, and store the resulting pose as animation data in another format, such as control knots in key frames expressed as joint angles.

Embodiments of the invention may use any inverse kinematics technique known in the art. For example, a typical inverse kinematic solution technique uses an energy function to determine a potential energy value for a pose of the jointed model. The rest pose of the jointed model typically has a minimum or zero potential energy value. Joints with attributes different from those in the rest pose, such as joints moved to different positions, increase the potential energy of the jointed model. For example, a joint may be assigned a rotation spring force of the form $F=k(\Delta\theta)$, where $\Delta\theta$ is the difference between a joint's current rotation angle and its angle in the rest pose and k is a joint spring constant, and a potential energy of $U=^{1/2} k\Delta\theta^2$. Joints manipulated by a user or other application are said to be constrained. An animation tool attempts to minimize the total potential energy of the jointed model by manipulating the attributes of the unconstrained joints. The final pose of the jointed model includes the constrained joints in their specified positions and the unconstrained joints in the positions that minimize the total potential energy of the jointed model.

Figure 2B:
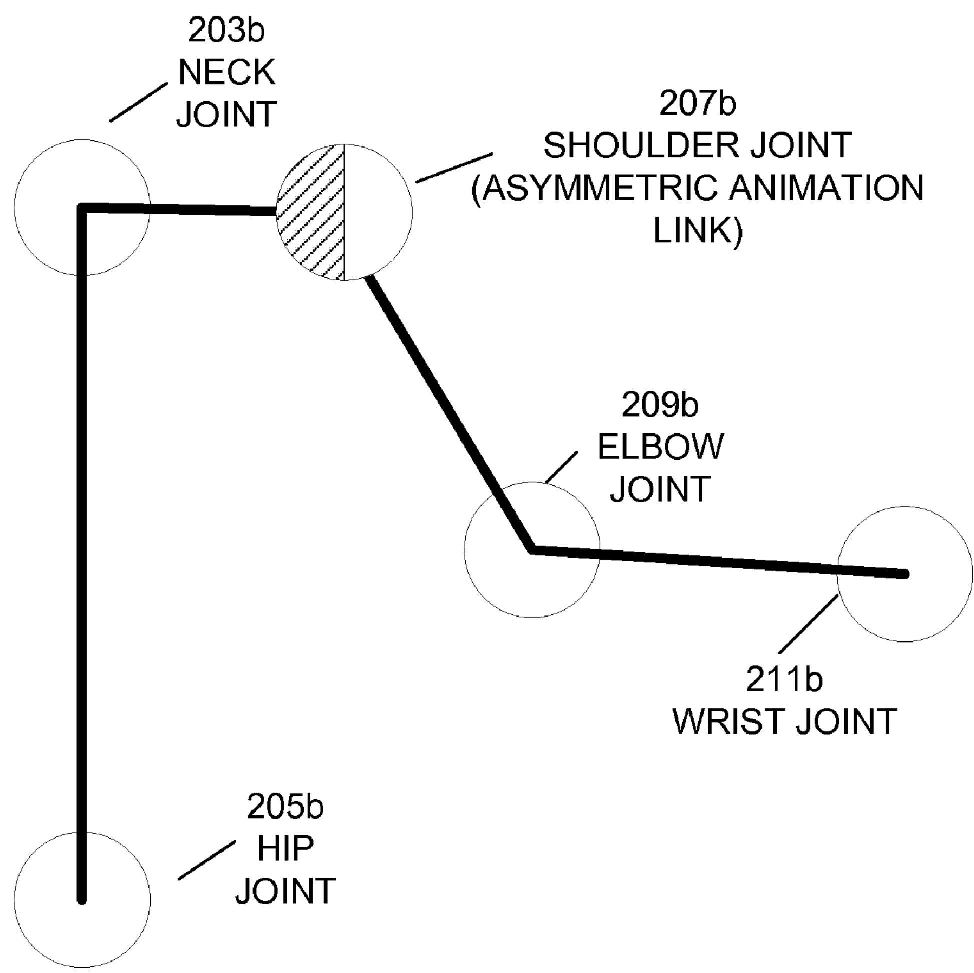

FIG. 2B illustrates an example pose 200*b* of the set of joints shown in FIG. 2A in response to the wrist joint 211*a* being moved to a new position 213*a*. In this example, the wrist joint 211*b* has been moved to the position 213*a* as shown in FIG. 2A. Additionally, the animation tool has moved the elbow joint 209*b* to a new position in example pose 200*b*. The shoulder joint 207*b*, being constrained by the asymmetric animation link, remains in the same position as that shown in FIG. 2A. The neck joint 203*b* and hip joint 205*b* also remain in the same positions as that shown in FIG. 2A because the asymmetric animation link associated with the shoulder joint

207*b* prevents motion from propagating through the shoulder joint 207*b* in the reverse direction.

Figure 2C:
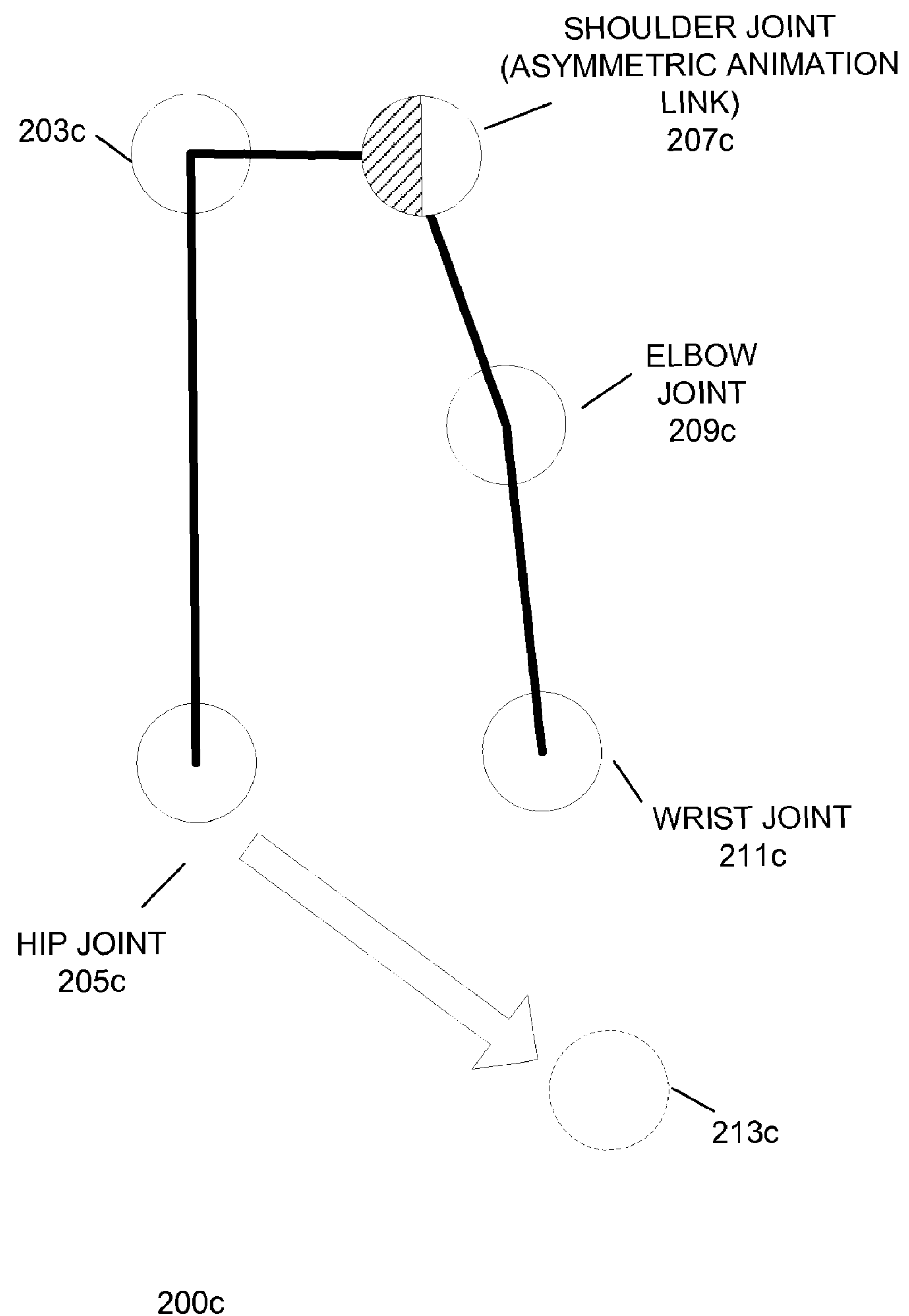
Figure 2D:
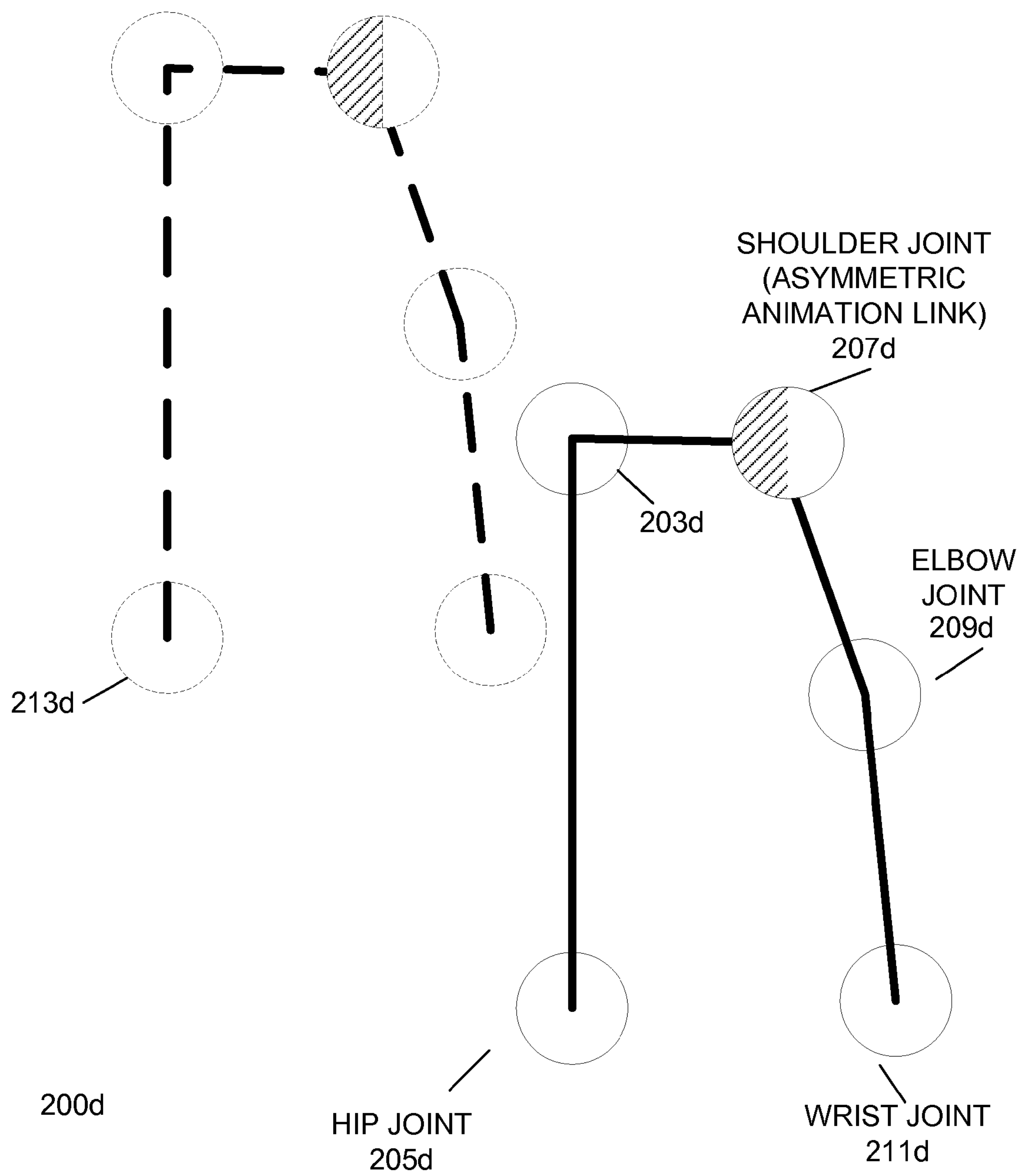

FIGS. 2C and 2D illustrate the operation of an example asymmetric animation link in the forward direction. FIG. 2C illustrates a pose 200*c* of the portion of the set of joints of FIG. 1, similar to the pose 200*a* shown in FIG. 2A. The character model includes a neck joint 203*c*; a hip joint 205*c*; a shoulder joint 207*c*; an elbow joint 209*c*; and a wrist joint 211*c*. The shoulder joint 207*c* is associated with an asymmetric animation link configured so that the elbow joint 209*c* is on the "forward" side and the neck joint 203*c* is on the "reverse" side of the asymmetric animation link.

In the example of FIG. 2C, a user or other application moves the hip joint 205*c* from its initial position to a new position 213*c*. This may occur in response to input from a keyboard, mouse, or other input device or from the output of a program, procedure, or application. In response to the movement of hip joint 205*c* to the new position 213*c*, the animation tool may use inverse kinematics to determine new positions for some or all of the joints connected with hip joint 205*c*.

As described above, an embodiment of the animation tool traverses the graph of joints connected with the manipulated joint, which in this example is the hip joint 205*c*. In this example, the motion of the hip joint 205*c* propagates from the hip joint 205*c* through the neck joint 203*c* to the shoulder joint 207*c*. The direction of propagation of this motion through the graph of joints corresponds with the "forward" direction defined by the asymmetric animation link associated with the shoulder joint 207*c*. Thus, the asymmetric animation link will pass through the shoulder joint 207*c* to influence additional joints. In this example, the motion of the hip joint further propagates to the elbow joint 209*c* and the wrist joint 211*c*. As a result, the animation tool defines a kinematic chain, which is a set of connected joints, including the hip joint 205*c*, the neck joint 203*c*, the shoulder joint 207*c*, the elbow joint 209*c*, and the wrist joint 211*c*. In this example, there are no other constraints on the set of joints, such as any pins.

FIG. 2D illustrates an example pose 200*d* of the set of joints shown in FIG. 2C in response to the hip joint 205*c* being moved to a new position 213*c*. In this example, the hip joint 205*d* has been moved to the position 213*c* as shown in FIG. 2C. In response to this movement of the hip joint 205*d*, the animation tool rigidly moves the entire set of joints. A rigid movement applies the same amount of displacement to each joint, such that the relative positions of the joints with respect to each other is unchanged. In this example, the neck joint 203*d*, hip joint 205*d*, shoulder joint 207*d*, elbow joint 209*d*, and wrist joint 211*d* are each displaced from their previous positions 213*d* by the same amount. Thus, the overall shape of the set of joints remains unchanged.

As discussed in detail in the following example, if the set of joints shown in FIG. 2C had also included a joint constraint, such as a pinned joint, then the set of joints would have moved non-rigidly and would have changed shape.

As described above, an asymmetric animation link may allow motion input to propagate in its forward direction and block motion input from propagating in its reverse direction. In a further embodiment, an asymmetric animation link may scale, weight, or otherwise modify a propagating motion input differently based on it directionality attribute. For example, an asymmetric animation link may allow a motion input aligned with its forward direction to propagate. Additionally, if the motion input is aligned with the reverse direction of the asymmetric animation link, it will scale or otherwise modify a motion input and propagate the modified motion input to other portions of the graph of joints or motion elements.

Asymmetric animation links can also be added when two or more models with separate sets of joints are connected together. This allows users to specify how movement in one model affects the pose of another model. FIGS. 3A-3E illustrate example operations of asymmetric animation links between two kinematic chains according to an embodiment of the invention.

Figure 3A:
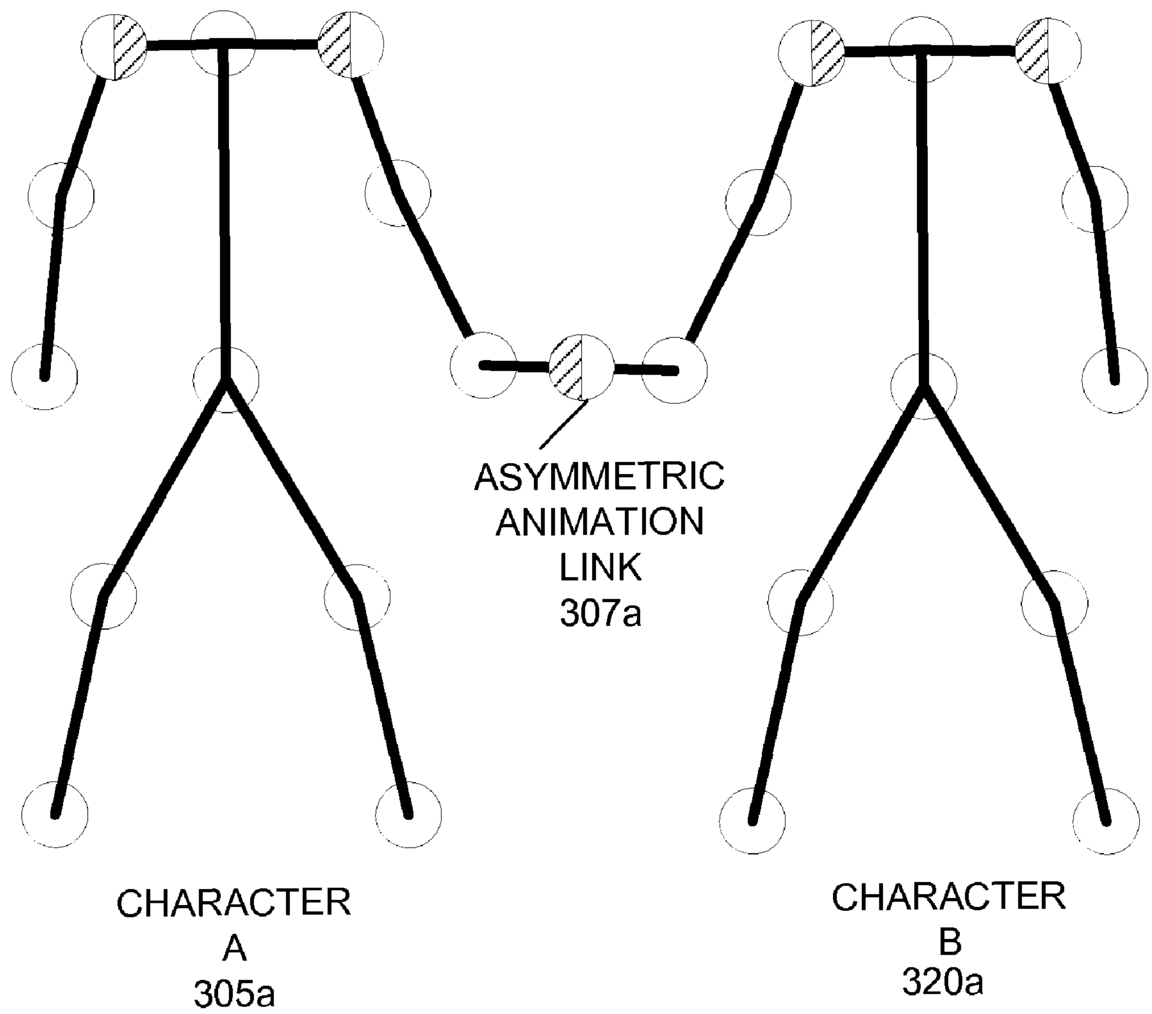
FIGS. 3A-3F illustrate example operations of asymmetric animation links between two models according to an embodiment of the invention.

FIG. 3A illustrates a set of jointed models 300*a*, including character model A 305*a* and character model B 320*a*. These two models 305*a* and 320*a* are connected at their wrist joints via an asymmetric animation link 307*a*. In this example, character model B 320*a* is on the "forward" side of the asymmetric animation link 307*a* and character model A 305*a* is on the "reverse side of the asymmetric animation link 307*a*.

Figure 3B:
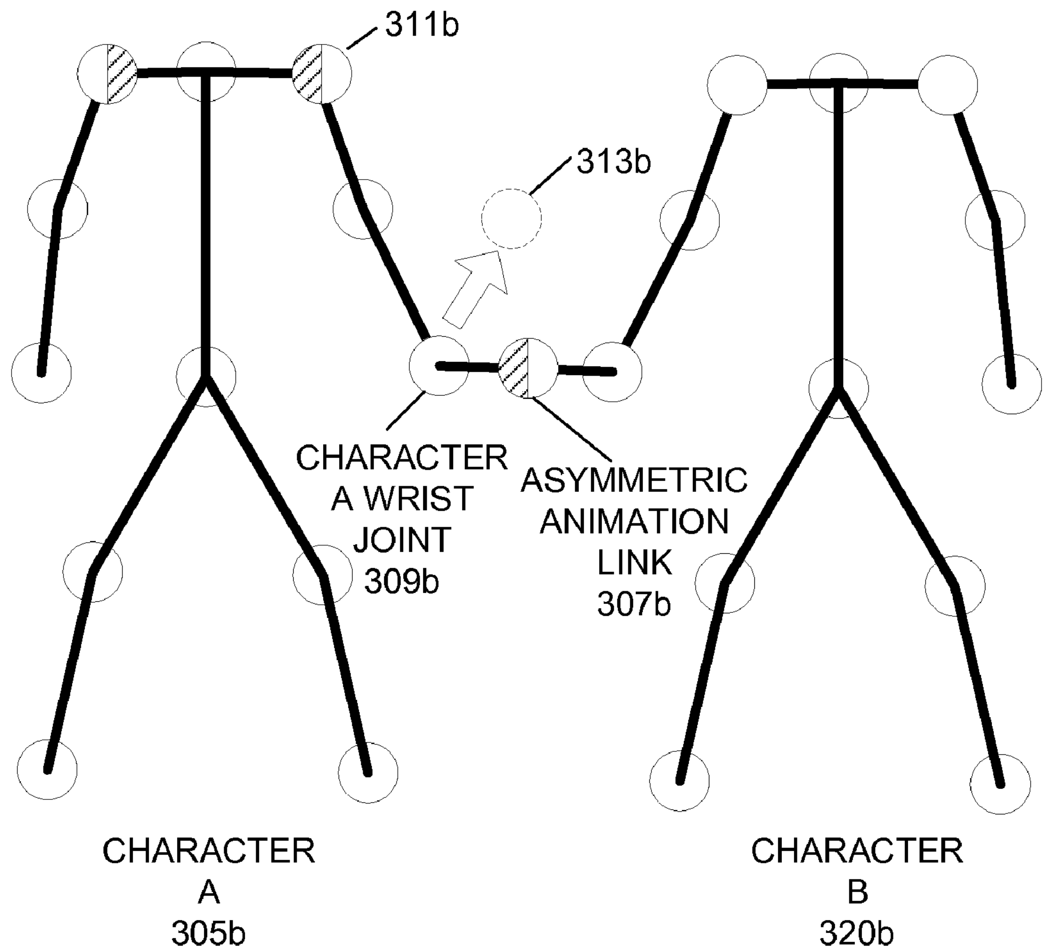

FIG. 3B illustrates a first example joint manipulation of a set of jointed models 300*b*. The set of jointed models 300*b* is similar to the set 300*a* shown in FIG. 3A. In this example, the set of jointed models 300*b* includes character model A 305*b*, character model B 320*b*, and asymmetric animation link 307*b*. The character model A 305*b* also includes an asymmetric animation link in its shoulder joint 311*b*.

In this example, a user or other application moves the wrist joint 309*b* of the character model A 305*b* from its initial position to a new position 313*b*. This may occur in response to input from a keyboard, mouse, or other input device or from the output of a program, procedure, or application. In response to the movement of wrist joint 309*b* to the new position 313*b*, the animation tool may use inverse kinematics to determine new positions for some or all of the joints connected with wrist joint 309*b*.

Figure 3C:
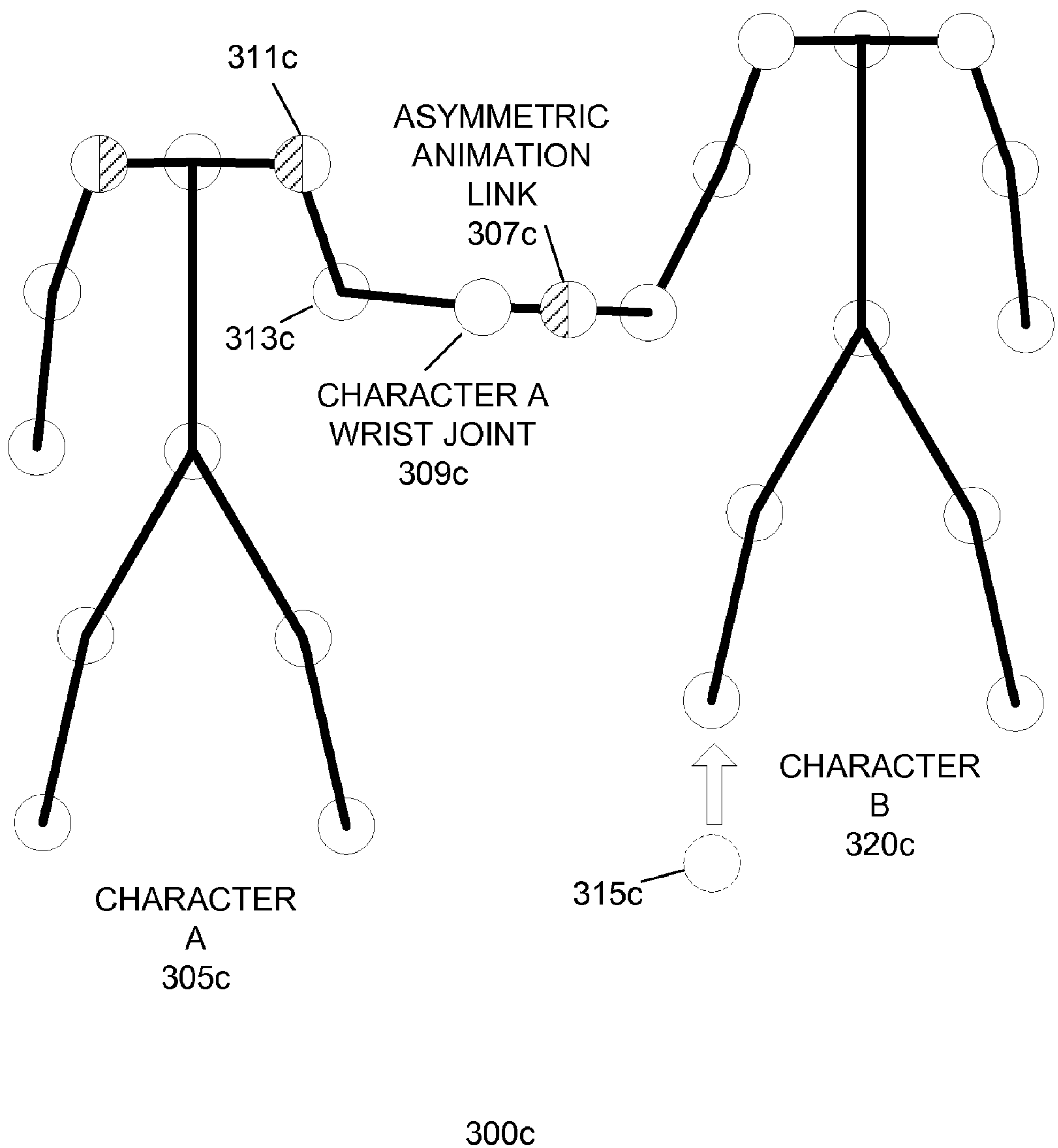

FIG. 3C illustrates an example pose 300*c* of the set of joints shown in FIG. 3B in response to the wrist joint 309*b* being moved to a new position 313*b*. In this example, the wrist joint 309*c* of character model A 305*c* has been moved to the position 313*b* as shown in FIG. 3B. Additionally, the animation tool has moved the elbow joint 313*c* to a new position in example pose 300*c*. The shoulder joint 311*c*, being constrained by the asymmetric animation link, remains in the same position as that shown in FIG. 3B. The neck joint and hip joint of character model 305*c* also remain in the same positions as that shown in FIG. 3B, because the asymmetric animation link associated with the shoulder joint 311*c* prevents motion from propagating through the shoulder joint 311*c* in the reverse direction.

Additionally, the motion of the wrist joint 309*c* also propagates to character model B 320*c*. In this example, motion from character model A 305*c* towards character model B 320*c* is traveling in the "forward" direction of asymmetric animation link 307*c*. Thus, the motion of the wrist joint 309*c* will pass through the asymmetric animation link 307*c* and affect the joints of character model B 320*c*. In this example, character model B 320*c* has no other constraints, such as pinned joints or other asymmetric animation links. Thus, character model B 320*c* moves rigidly from its previous position 315*c*, shown in detail in FIG. 3B, to a new position.

Figure 3D:
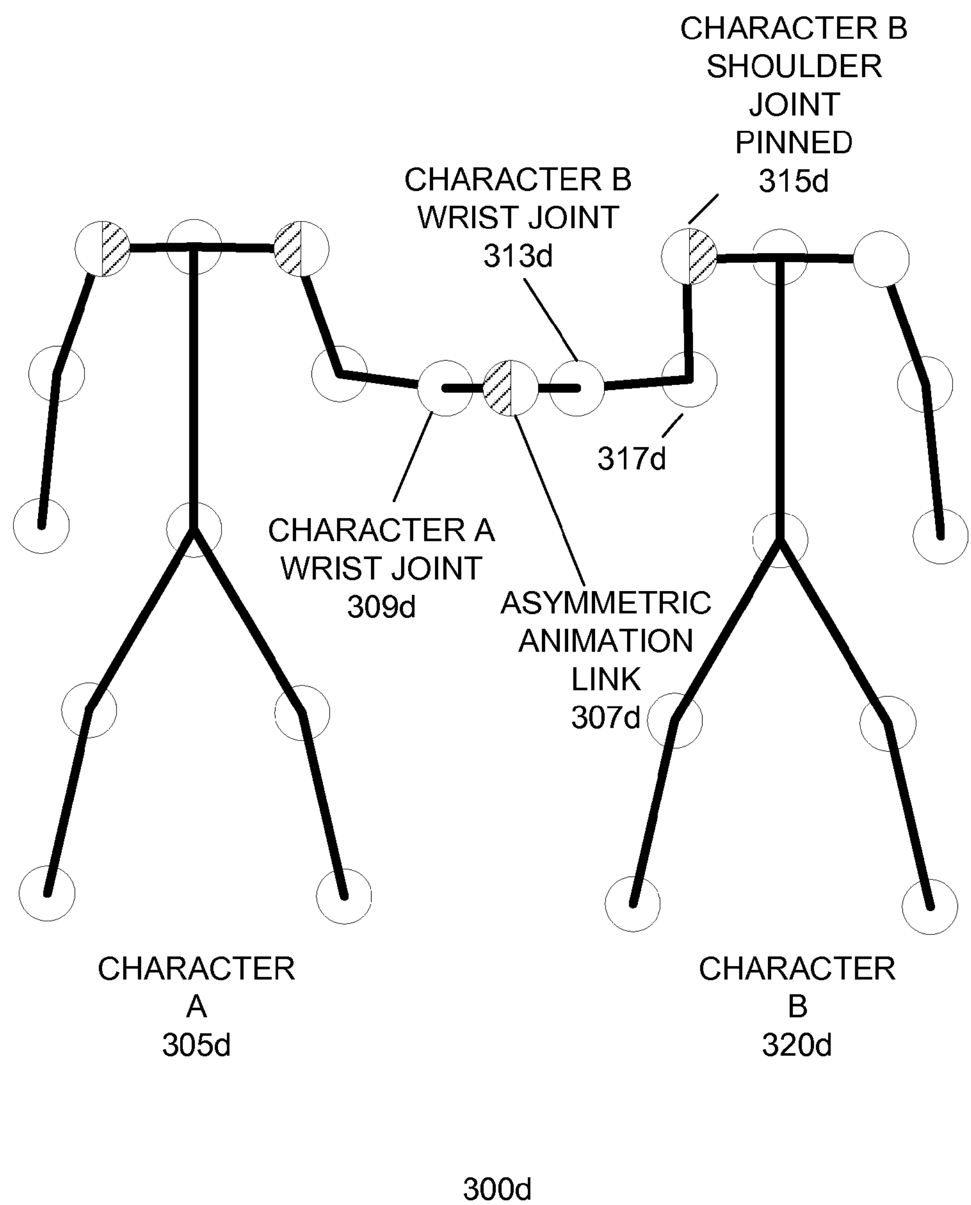

FIG. 3D illustrates an alternative example pose 300*d* in response in response to joint movement in character model A 305*d*. In this example, the shoulder joint 315*d* of character model B 320*d* also includes a pin or an asymmetric animation link that constrains the shoulder joint 315*d*. Thus, in this example, the movement of the character A wrist joint 309*d* propagates through asymmetric animation link 307*d* to affect the joints of character model B 320*d*, but only up to the shoulder joint 315*d*. As a result, the animation tool moves the wrist joint 313*d* and elbow joint 317*d* of character model B 320*d* in response to movement of the wrist joint 309*d* of character model A 305*d*.

Figure 3E:
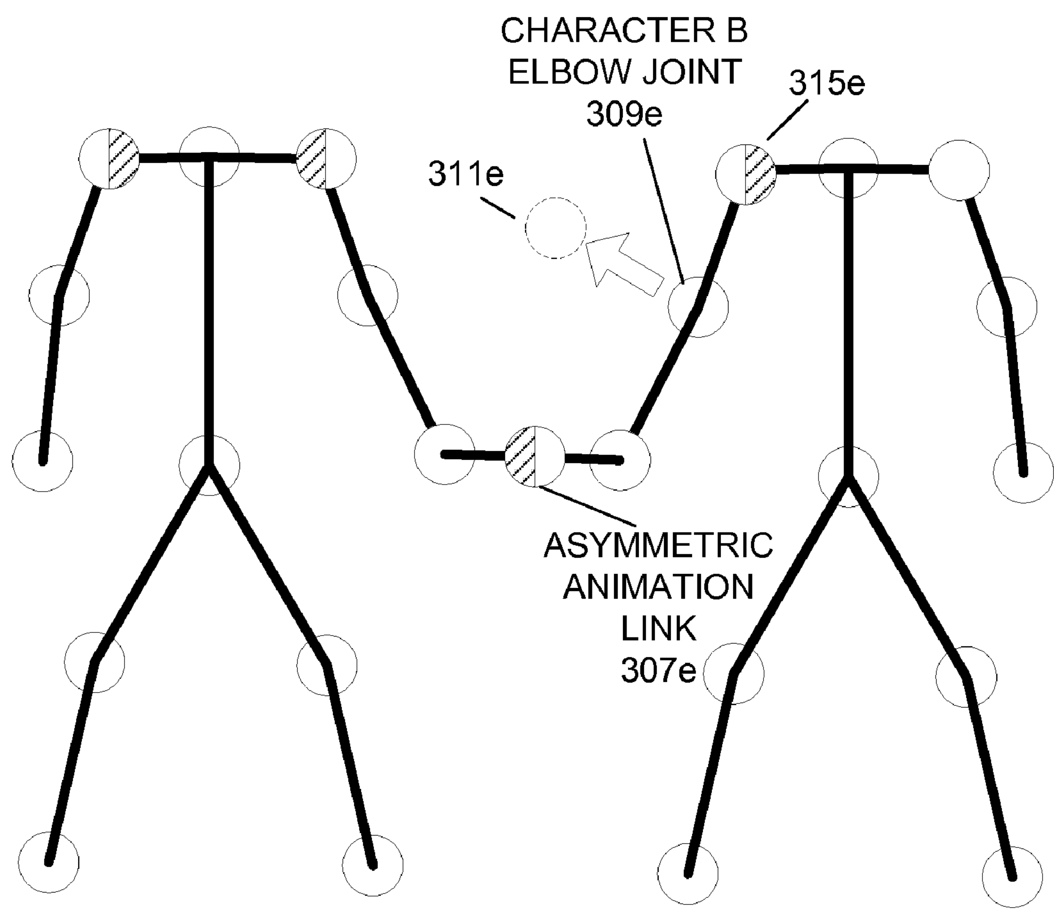
Figure 3F:
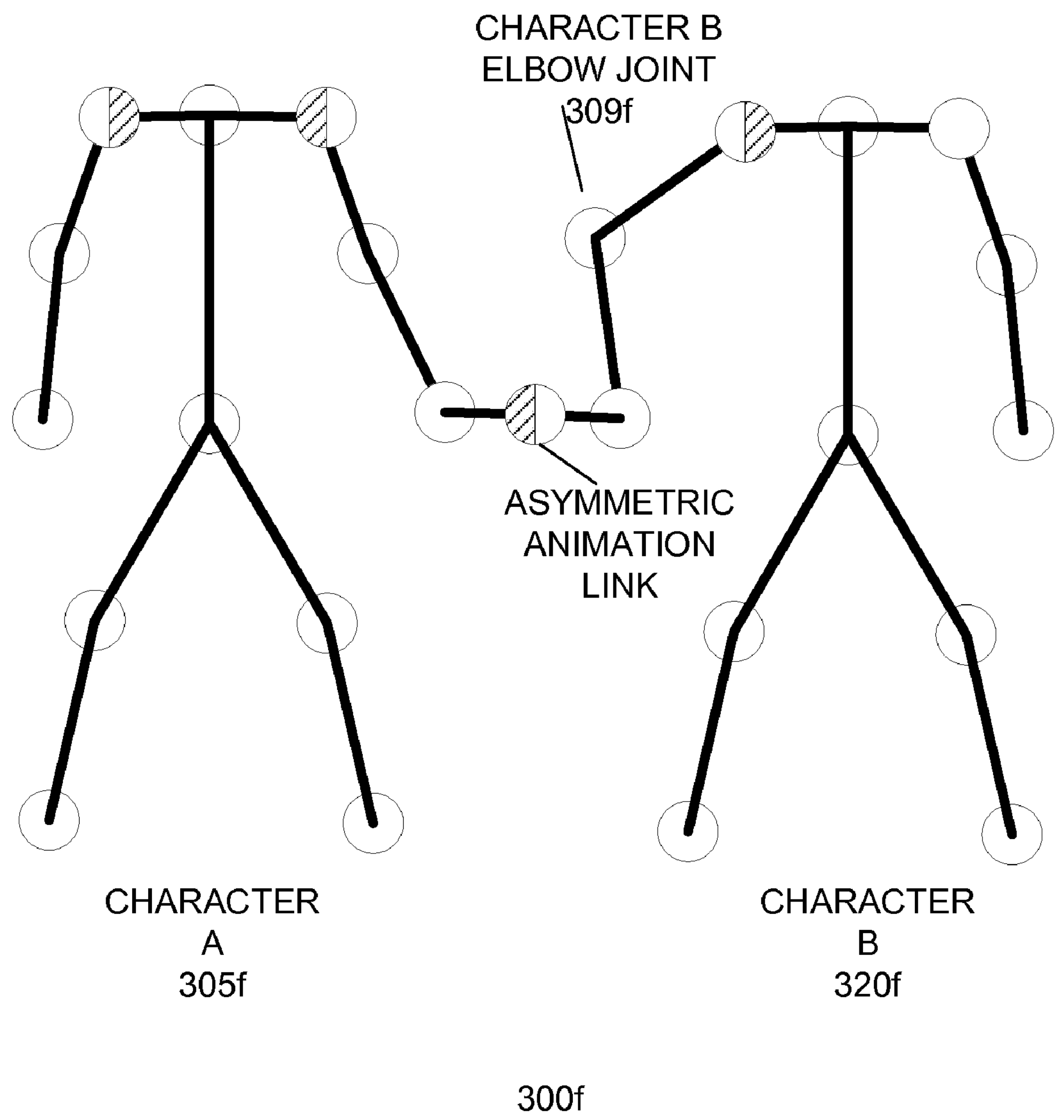

FIGS. 3E and 3F illustrate the operation of an example asymmetric animation link connecting two models in the reverse direction. FIG. 3E illustrates a pose 300*e* of character models A 305*e* and B 320*e*, similar to the pose 300*a* shown in FIG. 3A. In this example, the set of jointed models 300*e* includes character model A 305*e*, character model B 320*e*, and asymmetric animation link 307*e*. The character model A 305*e* includes an asymmetric animation link in its shoulder joint 313*e* and the character model B 320*e* includes an asymmetric animation link in its shoulder joint 315*e*.

In this example, a user or other application moves the elbow joint 309*e* of the character model B 320*e* from its initial position to a new position 311*e*. This may occur in response to input from a keyboard, mouse, or other input device or from the output of a program, procedure, or application. In response to the movement of elbow joint 309*e* to the new position 311*e*, the animation tool may use inverse kinematics to determine new positions for some or all of the joints connected with elbow joint 311*e*.

In this example, the movement of the elbow joint 309*e* propagates towards the asymmetric animation links 315*e* and 307*e*. The movement of the elbow joint 309*e* is in the "reverse" direction for the asymmetric animation link in the shoulder joint 315*e*. Thus, this asymmetric animation link blocks the movement of the elbow joint 309*e* from propagating any further through the graph of joints of character model B 320*e* and further constrains the shoulder joint 315*e* to its current position.

Similarly, the movement of the elbow joint 309*e* is in the "reverse" direction for the asymmetric animation link 307*e* connecting character model B 320*e* with character model A 305*e*. Thus, this asymmetric animation link blocks the movement of the elbow joint 309*e* from propagating to any of the joints of character model A 305*e* and further constrains the wrist joint 317*e* of character model B 320*e* to its current position.

In this example, the asymmetric animation links 307*e* and 315*e* define the kinematic chain associated with the movement of the elbow joint 309*e* to be only the elbow joint 309*e* itself, with the adjacent wrist joint 317*e* and shoulder joint 315*e* to be constrained to their current positions. FIG. 3F illustrates the resulting pose 300*f* of the character models 305*f* and 320*f*. Pose 300*f* includes the elbow joint 309*f* of character model 320*f* moved to a new position. The other joints of character models A 305*f* and B 320*f* remain in the same positions as specified in example pose 300*e*.

Figure 4:
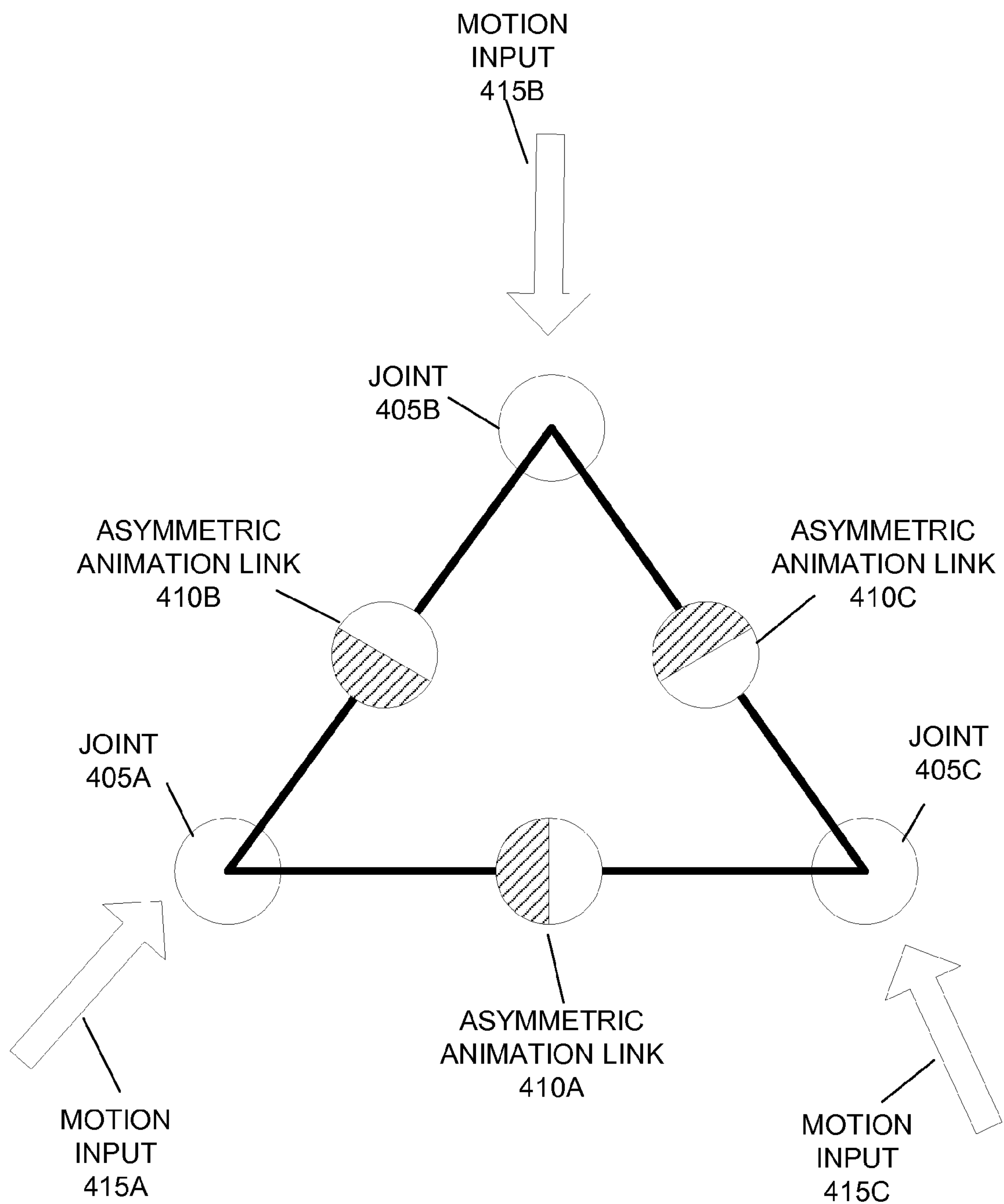
FIG. 4 illustrates an example arrangement and operation of asymmetric animation links according to an embodiment of the invention.

FIG. 4 illustrates an example arrangement and operation of asymmetric animation links according to an embodiment of the invention. Example 400 illustrates a set of three joints, 405*a*, 405*b*, and 405*c*. Asymmetric animation link 410*b* connects joints 405*a* and 405*b*. Asymmetric animation link 410*c* connects joints 405*b* and 405*c*. Asymmetric animation link 410*a* connects joints 405*a* and 405*c*.

In example 400, the directionality of the asymmetric animation links 410 is indicated by the shading of the circles, as described above. For example, asymmetric animation link 410*a* blocks motion input 415*a* from propagating from joint 405*a* to joint 405*b*, but allows motion input 415*c* to propagate from joint 405*c* to joint 405*a*.

Based on the directionality of the asymmetric animation links 410 in example 400, motion input 415*a* will propagate to joint 405*b* through asymmetric animation link 410*b* and to joint 405*c* through asymmetric animation link 410*a* (or through asymmetric animation links 410*b* and 410*c*). Motion input 415*b* will propagate from joint 405*b* to joint 405*c* via asymmetric animation link 410*c* but will be blocked from joint 405*a* by asymmetric animation links 410*a* and 410*b*. Motion input 415*c* will be blocked from affecting joints 405*a* and 405*b* by asymmetric animation links 410*a* and 410*c*.

Thus, in example 400, the directionality of the asymmetric animation links 410 allows motion input 415*a* at joint 405*a* to affect the other two joints 405*b* and 405*b*. However, the motion input 415*b* at joint 405*b* only affects joint 405*c*. The motion input 415*c* at joint 405*c* does not affect joints 405*a* or 405*b*. Furthermore, by changing the directionality of one or more of the asymmetric animation links, different sets of joints may be affected by a given motion input.

In general, the relationships between joints or other motion elements may be viewed as an undirected graph. The directionality attributes of asymmetric animation links in this undirected graph can be used to impose a directed graph or flowgraph on this undirected graph. By changing the directionality attributes of asymmetric animation links associated with a graph, a different directed graph or flowgraph may be derived from the same underlying undirected graph. Potentially, each permutation of directionality attributes of the set of asymmetric animation links may define a different directed graph or flowgraph from an underlying undirected graph.

Figure 5:
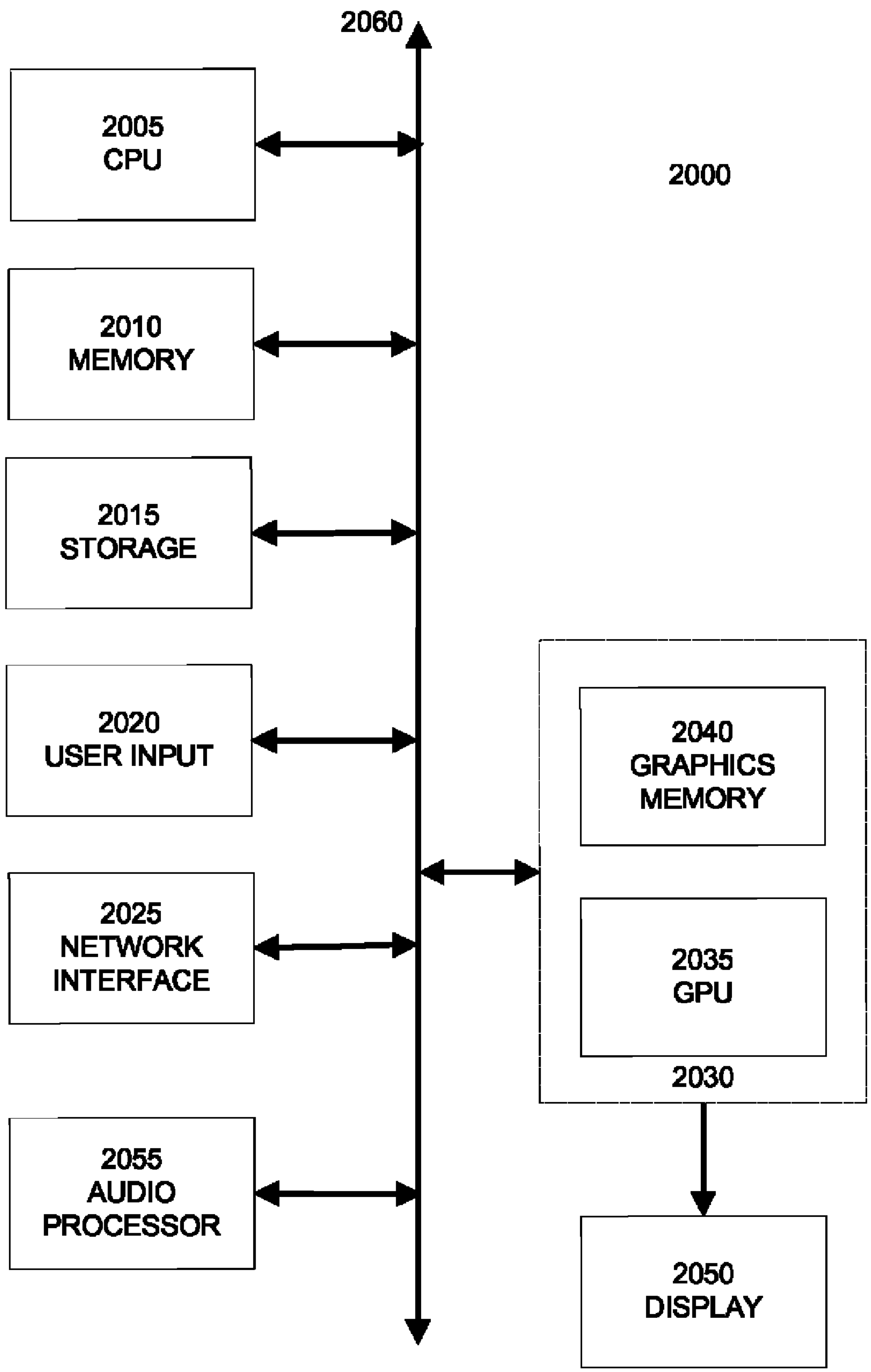
FIG. 5 illustrates an example computer system suitable for implementing embodiments of the invention.

FIG. 5 illustrates an example computer system 2000 suitable for implementing embodiments of the invention. FIG. 5 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, motion sensors, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to a renderfarm or a set of server computers, each similar to computer system 2000, via the network interface 2025 or storage 2015. The renderfarm generates one or more rendered images of the scene using the provided instructions and/or data. These rendered images may be stored on computer-readable media in a digital format and optionally returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can further include one or more programmable execution units capable of executing shader programs. GPU 2035 can be comprised of one or more graphics processing unit cores.

The CPU 2005, renderfarm, and/or GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays, as well as film recorders adapted to reproduce computer generated images on photographic film. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005. In still further embodiments, all or a portion of the graphics subsystem 2030 may be omitted and software executed by CPU 2005 may perform the functions of the graphics subsystem 2030.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of determining a pose of a dynamics system, the method comprising:

receiving a graph of motion elements, wherein the graph defines relationships between the motion elements;

receiving a motion input for a first motion element in the graph of motion elements;

propagating the motion input through the graph of motion elements to a second motion element associated with an asymmetric animation link, wherein the asymmetric animation link includes a direction attribute;

determining a propagation direction of the motion input from the first motion element to the second motion element;

comparing, by operation of one or more computer processors, the propagation direction attribute of the asymmetric animation link;

in response to the propagation direction being aligned with a forward direction of the direction attribute of the asymmetric animation link, defining an active subgraph of the dynamics system including the first motion element, the second motion element, and at least one additional motion element connected with the second motion element through the asymmetric animation link;

in response to the propagation direction being aligned with a reverse direction of the direction attribute of the asymmetric animation link, defining the active subgraph of the dynamics system including the first motion element and the second motion element, wherein the second motion element has an end position in the active subgraph of the dynamics system; and providing at least the active subgraph of the dynamics system and the motion input to a dynamics analysis system to determine a pose of at least the active subgraph of the dynamics system.

2. The method of claim 1, wherein the graph of motion elements includes a kinematic system of motion elements and the subgraph of the dynamics system includes a kinematic chain.

3. The method of claim 2, wherein providing the subgraph of the dynamics system and the motion input to a dynamics analysis system comprises:

providing the kinematic chain to the dynamics analysis system including an inverse kinematics system to determine at least a portion of the pose of the dynamics system.

4. The method of claim 1, wherein in response to the propagation direction being aligned with a reverse direction of the direction attribute of the asymmetric animation link, forming a subgraph of the dynamics system comprises:

constraining the second motion element to its current position in the subgraph of the motion elements.

5. The method of claim 1, wherein in response to the propagation direction being aligned with a forward direction of the direction attribute of the asymmetric animation link, the second motion element has an intermediate position in the subgraph of the dynamics system.

6. The method of claim 1, wherein the motion elements includes joints of at least one jointed model.

7. The method of claim 6, wherein the first motion element is associated with a first jointed model and a second motion element is associated with a second jointed model.

8. The method of claim 1, wherein receiving the motion input comprises:

receiving a motion element attribute via a user input.

9. The method of claim 1, wherein receiving the motion input comprises:

receiving a motion element attribute from an application.

10. The method of claim 1, wherein the motion input is expressed as a motion element position.

11. The method of claim 1, further comprising:

determining if the asymmetric animation link is in an inactive state; and in response to the determination that the asymmetric animation link is in the inactive state, propagating the motion input to at least one additional motion element connected with the second motion element through the asymmetric animation link to form a subgraph of the dynamics system including the first motion element, the second motion element, and at least the additional motion element regardless of the direction attribute of the asymmetric animation link.

12. The method of claim 1, further comprising:

receiving an additional input; and reversing the direction attribute of the asymmetric animation link in response to the additional input.

13. The method of claim 1, wherein the dynamics analysis system comprises a simulation system.

14. The method of claim 13, wherein the simulation system includes a kinetics simulation system.

15. The method of claim 14, wherein the simulation system includes a spring-mass simulation system.

16. The method of claim 13, wherein the simulation system includes a cloth simulation system.

17. The method of claim 1, wherein defining the active subgraph of the dynamics system including the first motion element, the second motion element, and at least the one additional motion element comprises:

propagating the motion input to at least the one additional motion element connected with the second motion element through the asymmetric animation link to form the active subgraph of the dynamics system including the first motion element, the second motion element, and the additional motion element.

18. The method of claim 1, wherein the asymmetric animation link is associated with a connection between the second motion element and the additional motion element.

19. A method of determining a pose of a system, the method comprising:

receiving a first motion element;

receiving a second motion element;

receiving a graph including an asymmetric animation link between the first and second motion elements, wherein the asymmetric animation link includes a direction attribute;

receiving first motion input applied to the first motion element;

determining a first propagation direction of the first motion input from the first motion element to the second motion element;

determining, by operation of one or more computer processors, a first function based on the direction attribute of the asymmetric animation link and the first propagation direction;

determining a first motion result from the first motion input and the first function;

applying a first motion result to the second motion element in response to the first motion input applied to the first motion element;

receiving a second motion input applied to the second motion element;

determining a second propagation direction of the second motion input from the second motion element to the first motion element;

determining, by operation of one or more computer processors, a second function based on the direction attribute of the asymmetric animation link and the second propagation direction;

determining a second motion result from the second motion input and the second function; and applying the second motion result to the first motion element in response to the second motion input applied to the second motion element;

wherein a relationship defined by the first function between the first motion input and the first motion result is different than a relationship defined by the second function between the second motion result and the second motion input.

20. The method of claim 19, wherein the second motion result is a scaled version of the second motion input.

21. The method of claim 20, wherein the second motion input has a non-zero magnitude and the second motion result has zero magnitude.

22. The method of claim 19, wherein the first motion input includes a motion element displacement.

23. The method of claim 19, wherein the first motion input includes a motion element rotation.

24. The method of claim 19, wherein the first motion input includes a motion element velocity.

25. The method of claim 19, wherein the first motion input includes a motion element acceleration.

26. The method of claim 19, wherein determining the first and second motion results comprises:

defining a first dynamics system including the first and second motion elements;

providing the first motion input and the first dynamics system to a dynamics analysis system to determine the first motion result;

defining a second dynamics system including the second motion element and not including the first motion element; and providing the second motion input and the second dynamics system to the dynamics analysis system to determine the second motion result.

27. The method of claim 19, wherein determining the first and second motion results comprises:

defining a first dynamics system including the first and second motion elements;

defining a first set of dynamics system constraints for the first dynamics system based on at least the first function;

providing the first motion input, the first dynamics system, and the first set of dynamics system constraints to a dynamics analysis system to determine the first motion result;

defining a second set of dynamics system constraints for the first dynamics system based on at least the second function; and providing the second motion input, the first dynamics system, and the second set of dynamics system constraints to the dynamics analysis system to determine the second motion result.

28. The method of claim 19, wherein the first and second motion elements are included in at least one jointed model.

29. The method of claim 28, wherein the first motion element is associated with a first jointed model and a second motion element is associated with a second jointed model.

30. The method of claim 19, wherein receiving the first motion input comprises:

receiving a motion element attribute via a user input.

31. The method of claim 19, wherein receiving the motion input comprises:

receiving a motion element attribute from an application.

32. The method of claim 19, wherein the first motion output is equal to the first motion input.

* * * * *

UNITED STATES PATENT AND TRADEMARK OFFICE

CERTIFICATE OF CORRECTION

PATENT NO. : 8,289,331 B1
APPLICATION NO. : 12/248857
DATED : October 16, 2012
INVENTOR(S) : Trezevant It is certified that error appears in the above-identified patent and that said Letters Patent is hereby corrected as shown below:

In the Claims:

Column 12, Claim 1, Line 9, please insert -- with the direction -- after direction.

Signed and Sealed this
Nineteenth Day of February, 2013

Teresa Stanek Rea
*Acting Director of the United States Patent and Trademark Office*